United States Patent
Ma et al.

(10) Patent No.: US 11,862,969 B2
(45) Date of Patent: Jan. 2, 2024

(54) OPTIMAL CONFIGURATION METHOD FOR HYBRID ENERGY STORAGE OF GRID-CONNECTED WIND STORAGE POWER GENERATION SYSTEM

(71) Applicant: Tianjin University, Tianjin (CN)

(72) Inventors: Chao Ma, Tianjin (CN); Rui Du, Tianjin (CN); Xiulan Pang, Tianjin (CN)

(73) Assignee: Tianjin University, Tianjin (CN)

( * ) Notice: Subject to any disclaimer, the term of this patent is extended or adjusted under 35 U.S.C. 154(b) by 383 days.

(21) Appl. No.: 17/386,628

(22) Filed: Jul. 28, 2021

(65) Prior Publication Data

US 2022/0077686 A1 Mar. 10, 2022

(30) Foreign Application Priority Data

Sep. 10, 2020 (CN) .......................... 202010947812.2

(51) Int. Cl.
*H02J 3/38* (2006.01)

(52) U.S. Cl.
CPC ........... *H02J 3/381* (2013.01); *H02J 2203/20* (2020.01); *H02J 2300/28* (2020.01)

(58) Field of Classification Search
CPC .... H02J 3/381; H02J 2203/20; H02J 2300/28; H02J 3/28; H02J 3/008; H02J 3/24;
(Continued)

(56) References Cited

FOREIGN PATENT DOCUMENTS

CN 110071505 B * 9/2020 .............. H02J 3/008

OTHER PUBLICATIONS

Paper "Multi-Objective Sizing of Hybrid Energy Storage System for Large Scale Photovoltaic Power Generation System", by chao Ma et al., published on "Sustainability", in Nov. 2019, retrieved [online] from <http://doi.10.3390/su11195441> (Year: 2019).*

(Continued)

*Primary Examiner* — Charles Cai
(74) *Attorney, Agent, or Firm* — Thomas | Horstemeyer, LLP (57) ABSTRACT

An optimal configuration method for a hybrid energy storage of a grid-connected wind storage power generation system is provided, including: performing a frequency domain decomposition on a historical wind power output, to count high-frequency and low-frequency components of the historical wind power output, and determining a rated power of the hybrid energy storage based on a probability distribution function; establishing a hybrid energy storage capacity optimization model for a full life cycle of a wind farm to minimize a net present value of an annual cost and maximize a target satisfaction rate of an output; extracting a daily typical scenario for the wind power output based on a clustering algorithm to count a time proportion of each typical scenario as an input scenario of the hybrid energy storage capacity optimization model for the full life cycle of the wind farm; and solving with a multi-objective optimization algorithm, to obtain an optimal hybrid energy storage capacity configuration scheme for the grid-connected wind storage power generation system. By optimizing a distribution of the high- and low-frequency fluctuation components between the hybrid energy storage, a battery life is extended while a fluctuation smoothing effect is effectively improved.

8 Claims, 6 Drawing Sheets

(58) Field of Classification Search
CPC .... H02J 3/32; H02J 3/48; Y02E 10/76; Y02E 70/30
See application file for complete search history.

(56) References Cited

OTHER PUBLICATIONS

Research on Influence of Stability of Islanding Microgrid with Dynamic Load (59 pages).

Pang Ming, et al., "Optimal Sizing of Hybrid Energy Storage System Taking into Account Economic Factors and Power Allocation," Journal of Northwestern Polytechnical University, Aug. 2018, vol. 36, No. 4 (6 pages).

Songziyou, "Li-Battery/Supercapacitor Hybrid Energy Storage System for Bus," Dissertation Submitted to Tsinghua University, Apr. 2016 (139 pages).

* cited by examiner

OPTIMAL CONFIGURATION METHOD FOR HYBRID ENERGY STORAGE OF GRID-CONNECTED WIND STORAGE POWER GENERATION SYSTEM

CROSS REFERENCE TO RELATED APPLICATION(S)

This patent application claims the benefit and priority of Chinese Patent Application No. 202010947812.2 filed on Sep. 10, 2020, the disclosure of which is incorporated by reference herein in its entirety as part of the present application.

TECHNICAL FIELD

The present disclosure relates to an optimal configuration method for a hybrid energy storage of a grid-connected wind storage power generation system.

BACKGROUND ART

At present, a wind power is intermittent and variable. If an uncontrolled power is directly connected to a grid, high-frequency and high-amplitude power fluctuations will cause voltage fluctuations, thereby reducing grid reliability and power quality, and affecting sensitive production equipment. An integration of an energy storage system into the wind storage power generation system may overcome some of challenges associated with wind energy. Energy storage plays an important role in a prediction error compensation, a tracking response and a frequency control, and may improve a stability and a value of unstable wind energy. In existing research, Ma Wei established a multi-objective model that considers a net profit of a system and a state of charge (SOC) of the energy storage in response to an electricity limitation and fluctuations of renewable energy, and proposed an optimization and correction strategy for operation. Song Ziyou achieved a capacity optimization with comprehensive objectives of extending a battery life and reducing costs, and verified a robustness of the optimization strategy to a price of the energy storage. Pang Ming used a genetic algorithm (GA) to optimize a power and a capacity configuration of the hybrid energy storage system (HESS) of wind power with a minimized costs, and achieved a demand for smoothing fluctuations. Therefore, in order to improve the stability of the power output and meet a flexibility of grid dispatching, it is necessary to equip the wind power system with suitable energy storage devices. According to a discharge rate, an energy and a power density, etc., the energy storage devices are divided into type I power energy storage devices and type II energy storage devices. Type I power energy storage devices are suitable for providing a low and stable load for a long term, while type II energy storage devices are suitable for making a short-term and fast response to a frequent charge and discharge switching. Due to the high-frequency and high-amplitude fluctuations of a wind power output, it is difficult for a single energy storage type to meet various needs. Therefore, it is urgent to minimize a cost of energy storage capacity configuration while improving the stability of the wind power output.

SUMMARY

In order to solve the technical problem existing in the conventional art, the present disclosure provides an optimal configuration method for a hybrid energy storage of a grid-connected wind storage power generation system.

In order to solve the technical problem existing in the conventional art, the present disclosure adopts the following technical solution. The hybrid energy storage optimal configuration method for the grid-connected wind storage power generation system includes: performing a frequency domain decomposition on a historical wind power output, to count a high-frequency component and a low-frequency component of the historical wind power output, and determining a rated power of the hybrid energy storage based on a probability distribution function; establishing a hybrid energy storage capacity optimization model for a full life cycle of a wind farm to minimize a net present value (NPV) of an annual cost and maximize a target satisfaction rate (TSR) of an output; extracting a daily typical scenario for the wind power output based on a clustering algorithm, to count a time proportion of each typical scenario as an input scenario of the hybrid energy storage capacity optimization model for the full life cycle of the wind farm; and solving with a multi-objective optimization algorithm, to obtain an optimal hybrid energy storage capacity configuration scheme for the grid-connected wind storage power generation system.

Further, the frequency domain decomposition on the historical wind power output comprises a wavelet decomposition, a Kalman filtering and/or an empirical mode decomposition (EMD).

Further, the clustering algorithm may include a K-means clustering method, a hierarchical clustering method and/or a Gaussian mixture model method.

Further, an objective function $F_1$ may be established to minimize the NPV of the annual cost:

$$F_1 = \text{minimize} \sum_{k=1}^{2} \left( C_{Ik} + \sum_{t=1}^{N_k} \frac{C_{Rk}}{(1+r-I)^{n_{k,t}}} \right),$$

where $$N_k = \left[ \sum_{j=1}^{J} \frac{S_{j,k} \cdot p_j \cdot L \cdot 365}{d_k \cdot C_k \cdot c_{yk}} \right] - 1;$$

$$C_{Rk} = \alpha \cdot \beta_n \cdot C_{Ik} = \alpha \cdot \beta_n \cdot A_k \cdot C_k;$$

where, $C_{Ik}$ is an initial cost of a k-th energy storage device, in CNY; $C_{Rk}$ is a replacement cost of the k-th energy storage device, in CNY; $N_k$ is a replacement time of the k-th energy storage device, in hours; r is a discount rate for converting a future fund into a present value; I is an inflation rate; $n_{k,t}$ is a period for a k-th replacement of the energy storage device, in years; α is a ratio of the replacement cost to the initial cost; $\beta_n$ is a cost reduction coefficient of an energy storage material in an n-th year; $S_{j,k}$ is a stored electric quantity of the k-th energy storage device in a j-th typical scenario, in MWh; $p_j$ is a time proportion of the j-th typical scenario; L is an operational lifespan of the wind farm, in years; di is a discharge depth of the k-th energy storage device; $C_k$ is a capacity of the k-th energy storage device, in MWh; $c_{yk}$ is a cycle number of the energy storage device; $A_k$ is a unit system cost of the k-th energy storage device, in CNY/MWh.

Further, an objective function $F_2$ may be established to maximize the TSR of the outputtarget satisfaction rate:

$$F_2 = \text{maximize} \sum_{j=1}^{J} p_j \cdot TSR_j,$$

where $$TSR_j = \frac{\sum_{i=1}^{T} \omega_{i,j}}{T};$$

$$\omega_{i,j} = \begin{cases} 1 & P_{i,j} = \overline{P_{i,j}} \\ 0 & P_{i,j} \neq \overline{P_{i,j}} \end{cases};$$

where, $TSR_j$ is a TSR of a hybrid energy storage system (HESS) in the j-th typical scenario; T is a total running period, in min; $\omega_{i,j}$ is a determination coefficient for determining whether a system power output is equal to a target power at an i-th minute of the j-th typical scenario; $P_{i,j}$ is the system power output at the i-th minute of the j-th typical scenario; $\overline{P_{i,j}}$ is the target power at the i-th minute of the j-th typical scenario; J is a total number of the typical scenarios; $p_j$ is a time proportion of the j-th typical scenario.

Further, the hybrid energy storage capacity optimization model for the full life cycle of the wind farm may have constraints, including:

an energy storage charge and discharge power constraint:

$$\begin{cases} P_{c,min} < P_{c,t} < P_{c,max} \\ P_{d,min} < P_{d,t} < P_{d,max} \end{cases};$$

a power balance constraint:

$$SOC_t = \begin{cases} SOC_{t-1} + \eta_c P_{c,t} \Delta t / S_{Wh} \\ SOC_{t-1} - P_{d,t} \Delta t / (S_{Wh} \eta_d) \end{cases};$$

and an energy storage state of charge (SOC) constraint: $SOC_{min} \leq SOC_t \leq SOC_{max}$;

where, $P_{c,t}$ is an energy storage charge power at time t, in MW; $P_{d,t}$ is an energy storage discharge power at time t, in MW; $P_{c,min}$ is a lower limit of the energy storage charge power, in MW; $P_{d,min}$ is a lower limit of the energy storage discharge power, in MW; $P_{c,max}$ is an upper limit of the energy storage charge power, in MW; $P_{d,max}$ is an upper limit of the energy storage discharge power, in MW; $\eta_c$ is an energy storage charge efficiency; $\eta_d$ is an energy storage discharge efficiency; $\Delta t$ is a control interval, in min; $S_{Wh}$ is a rated capacity of the energy storage, in MW; $SOC_t$ is an energy storage at time t; $SOC_{t-1}$ is an energy storage at time t−1; $SOC_{min}$ is a lower limit of the energy storage; $SOC_{max}$ is an upper limit of the energy storage.

Further, $PRR_{\Delta t}$ may be set as a smoothing index for a target power curve of wind power; $PRR_{\Delta t}$ may be used to evaluate a fluctuation smoothing effect of the target power curve of the wind power, and $PRR_{\Delta t}$ may be calculated as follows:

$$PRR_{\Delta t} = \frac{P_{max,\Delta t} - P_{min,\Delta t}}{P_R} \times 100\%;$$

where, $P_{max,\Delta t}$ is a maximum wind power output during $\Delta t$, in MW; $P_{min,\Delta t}$ is a minimum wind power output during $\Delta t$, in MW; $P_R$ is a rated power of the wind storage power generation system.

Further, the multi-objective optimization algorithm may include a dynamic programming algorithm or a heuristic algorithm.

Further, the heuristic algorithm may include a genetic algorithm (GA), an artificial neural network (ANN) and an ant colony algorithm (ACA).

The present disclosure has the following advantages and beneficial effects.

The present disclosure proposes the optimal configuration method for a hybrid energy storage of the grid-connected wind storage power generation system. A wind power output process is decomposed to obtain a target power curve and the high- and low-frequency fluctuation components. The high- and low-frequency fluctuation components are analyzed to determine a hybrid energy storage power. The optimal operation of the wind storage system in a typical wind power scenario is simulated. And finally an optimal capacity configuration scheme for the hybrid energy storage is obtained with the multi-objective optimization algorithm.

According to the analysis of the historical data of the wind storage power generation system in a certain area, the typical wind power scenarios and the time proportions thereof are determined, and a probabilistic reliability analysis is performed based on the data of the typical wind power scenarios, which is suitable for any wind storage power generation system with certain measured historical data, and has a high portability.

According to the present disclosure, the differences in the energy storage characteristics are considered and reasonably utilized to achieve desirable complementary advantages. By optimizing the distribution of the high- and low-frequency fluctuation components between the hybrid energy storages, the fluctuation smoothing effect is effectively improved while the battery life is extended.

The hybrid energy storage capacity optimization model for the full life cycle of the wind farm in the present disclosure may improve the stability of the wind power output while minimizing the cost of capacity configuration, which has a better economic applicability than a single energy storage method, and provides a theoretical basis and a technical support for a wide application of the wind storage power generation system.

DETAILED DESCRIPTION OF THE EMBODIMENTS

In order to facilitate a further understanding of the content, features and effects of the present disclosure, the present disclosure is described in detail below in conjunction with the embodiments and accompanying drawings.

As shown in FIGS. 1 to 8, an hybrid energy storage optimal configuration method for a grid-connected wind storage power generation system is provided. According to the present disclosure, a frequency domain decomposition is performed on a historical wind power output, to count a high-frequency component and a low-frequency component of the historical wind power output, and a rated power of the hybrid energy storage is determined based on a probability distribution function; a hybrid energy storage capacity optimization model for a full life cycle of a wind farm is established to minimize a net present value (NPV) of an annual cost and maximize a target satisfaction rate (TSR); a daily typical scenario for the wind power output is extracted based on a clustering algorithm, to count a time proportion of each typical scenario as an input scenario of the hybrid energy storage capacity optimization model for the full life cycle of the wind farm; and the hybrid energy storage capacity optimization model for the full life cycle of the wind farm is solved with a multi-objective optimization algorithm, to obtain an optimal hybrid energy storage capacity configuration scheme for the grid-connected wind storage power generation system.

The fluctuation smoothing effect of an optimized target power curve of wind power may be evaluated, parameters in the optimization algorithm may be adjusted according to the evaluation result, and the hybrid energy storage capacity optimization model for the full life cycle of the wind farm may be further solved and optimized.

In an embodiment, the frequency domain decomposition on the wind power output may include a wavelet decomposition, a Kalman filtering and/or an empirical mode decomposition (EMD). The wavelet decomposition, the Kalman filtering and the EMD may be corresponding algorithms in the conventional art.

In an embodiment, the clustering algorithm may include a K-means clustering method, a hierarchical clustering method and/or a Gaussian mixture model method. The K-means clustering method, the hierarchical clustering method and the Gaussian mixture model method algorithm may be corresponding algorithms in the conventional art.

The hybrid energy storage capacity optimization model for the full life cycle of the wind farm includes objective functions, decision variables and constraints.

Wherein, the decision variables are energy storage capacities, which may be divided into a power-type energy storage capacity and an energy-type energy storage capacity, i.e., $C_k$ (k=1, 2), in MWh.

In an embodiment, an objective function $F_1$ is established to minimize the NPV of the annual cost:

$$F_1 = \text{minimize} \sum_{k=1}^{2}\left(C_{Ik} + \sum_{t=1}^{N_k} \frac{C_{Rk}}{(1+r-I)^{n_{k,t}}}\right),$$

where $$N_k = \left[\sum_{j=1}^{J} \frac{S_{j,k} \cdot p_j \cdot L \cdot 365}{d_k \cdot C_k \cdot c_{yk}}\right] - 1;$$

$$C_{Rk} = \alpha \cdot \beta_n \cdot C_{Ik} = \alpha \cdot \beta_n \cdot A_k \cdot C_k;$$

where, $C_{Ik}$ is an initial cost of a k-th energy storage device, in CNY; $C_{Rk}$ is a replacement cost of the k-th energy storage device, in CNY; $N_k$ is a replacement time of the k-th energy storage device, in hours; r is a discount rate for converting a future fund into a present value; I is an inflation rate; $n_{k,t}$ is a period for a k-th replacement of the energy storage device, in years; a is a ratio of the replacement cost to the initial cost; pn is a cost reduction coefficient of an energy storage material in an n-th year; $S_{j,k}$ is a stored electric quantity of the k-th energy storage device in a j-th typical scenario, in MWh; $p_j$ is a time proportion of the j-th typical scenario; L is an operational lifespan of the wind farm, in years; $d_k$ is a discharge depth of the k-th energy storage device; $C_k$ is a capacity of the k-th energy storage device, in MWh; $c_{yk}$ is a cycle number of the energy storage device; $A_k$ is a unit system cost of the k-th energy storage device, in CNY/MWh.

In an embodiment, an objective function $F_2$ is established to maximize the TSR of the output:

$$F_2 = \text{maximize} \sum_{j=1}^{J} p_j \cdot TSR_j,$$

where $$TSR_j = \frac{\sum_{i=1}^{T} \omega_{i,j}}{T};$$

$$\omega_{i,j} = \begin{cases} 1 & P_{i,j} = \overline{P_{i,j}} \\ 0 & P_{i,j} \neq \overline{P_{i,j}} \end{cases};$$

where, $TSR_j$ is a TSR of a hybrid energy storage system (HESS) in the j-th typical scenario; T is a total running period, in min; $\omega_{i,j}$ is a determination coefficient for determining whether a system power output is equal to a target power at an i-th minute of the j-th typical scenario; $P_{i,j}$ is the system power output at the i-th minute of the j-th typical scenario; $\overline{P_{i,j}}$ is the target power at the i-th minute of the j-th typical scenario; J is a total number of the typical scenarios; P, is a time proportion of the j-th typical scenario.

In an embodiment, the hybrid energy storage capacity optimization model for the full life cycle of the wind farm has constraints, including:

an energy storage charge and discharge power constraint:

$$\begin{cases} P_{c,min} < P_{c,t} < P_{c,max} \\ P_{d,min} < P_{d,t} < P_{d,max} \end{cases};$$

a power balance constraint:

$$SOC_t = \begin{cases} SOC_{t-1} + \eta_c P_{c,t} \Delta t / S_{Wh} \\ SOC_{t-1} - P_{d,t} \Delta t / (S_{Wh} \eta_d) \end{cases};$$

and an energy storage state of charge (SOC) constraint: $SOC_{min} \leq SOC_t \leq SOC_{max}$.

Wherein, all the variables above have non-negative values.

Where, $P_{c,t}$ is an energy storage charge power at time t, in MW; $P_{d,t}$ is an energy storage discharge power at time t, in MW; $P_{c,min}$ is a lower limit of the energy storage charge power, in MW; $P_{d,min}$ is a lower limit of the energy storage discharge power, in MW; $P_c$,ax is an upper limit of the energy storage charge power, in MW; $P_{d,max}$ is an upper limit of the energy storage discharge power, in MW; $\eta_c$ is an energy storage charge efficiency; $\eta_d$ is an energy storage discharge efficiency; $\Delta t$ is a control interval, in min; $S_{Wh}$ is a rated capacity of the energy storage, in MW; $SOC_t$ is an energy storage at time t; $SOC_{t-1}$ is an energy storage at time t−1; $SOC_{min}$ is a lower limit of the energy storage; $SOC_{max}$ is an upper limit of the energy storage.

In an embodiment, $PRR_{\Delta t}$ is set as a smoothing index for a target power curve of wind power; $PRR_{\Delta t}$ is used to evaluate a fluctuation smoothing effect of the target power curve of the wind power, and $PRR_{\Delta t}$ is calculated as follows:

$$PRR_{\Delta t} = \frac{P_{max,\Delta t} - P_{min,\Delta t}}{P_R} \times 100\%;$$

where, $P_{max,\Delta t}$ is a maximum wind power output during $\Delta t$, in MW; $P_{min,\Delta t}$ is a minimum wind power output during $\Delta t$, in MW; $P_R$ is a rated power of the wind storage power generation system.

In an embodiment, the multi-objective optimization algorithm may include a dynamic programming algorithm or a heuristic algorithm. The dynamic programming algorithm and the heuristic algorithm may be corresponding algorithms in the conventional art.

In an embodiment, the heuristic algorithm may include a genetic algorithm (GA), an artificial neural network (ANN) and an ant colony algorithm (ACA). The GA, the ANN and the ACA may be corresponding algorithms in the conventional art.

The working principle and workflow of the present disclosure are described below with reference to a preferred embodiment of the present disclosure.

This embodiment demonstrates a wind storage power generation system with a total installed capacity of 99 MW and an operating period of 20 years. The energy storage of the wind storage power generation system may include power-type energy storage (type I) and energy-type energy storage (type II), which are divided according to the characteristics of energy storage materials, such as an energy storage discharge rate, an energy density and a power density.

Figure 1:
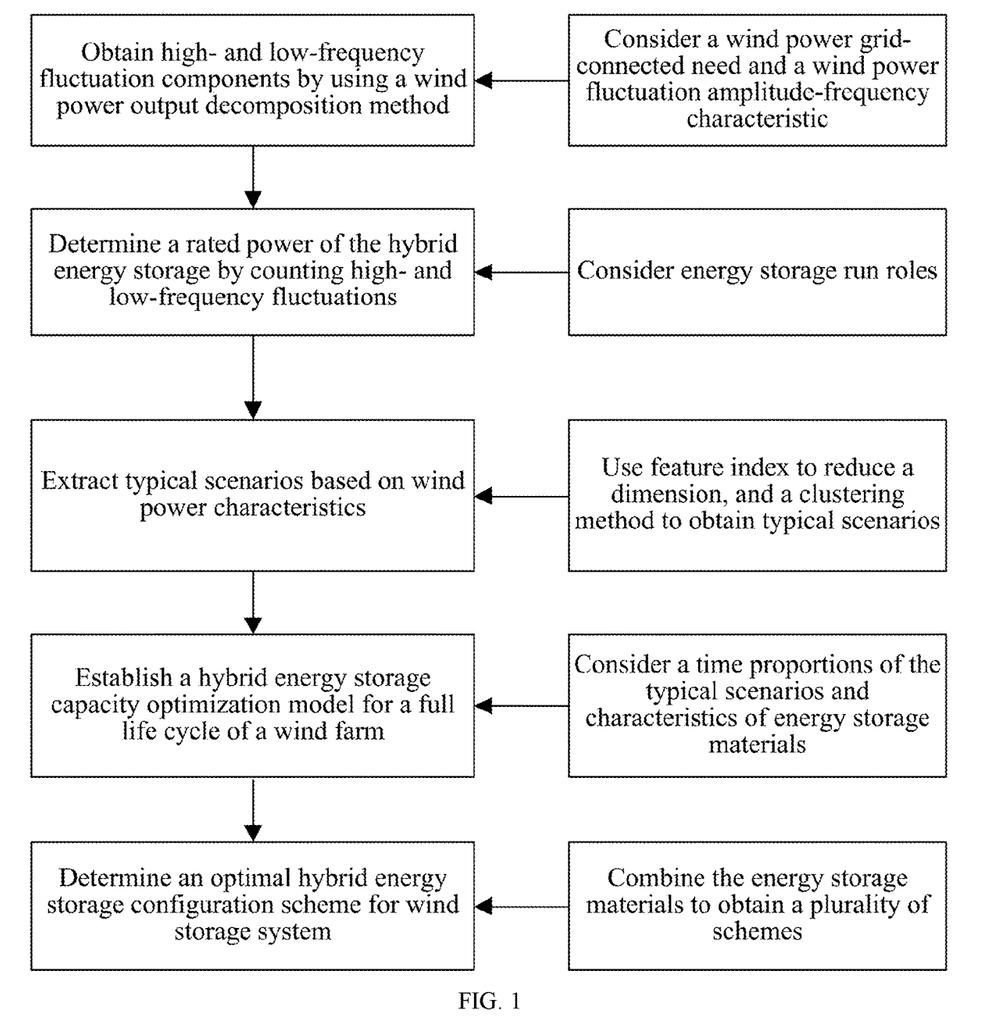
FIG. 1 is a flowchart of an optimal configuration method for a hybrid energy storage of a grid-connected wind storage power generation system according to the present disclosure.

According to the flowchart in FIG. 1, the method specifically includes the following steps 1-5.

Figure 2:
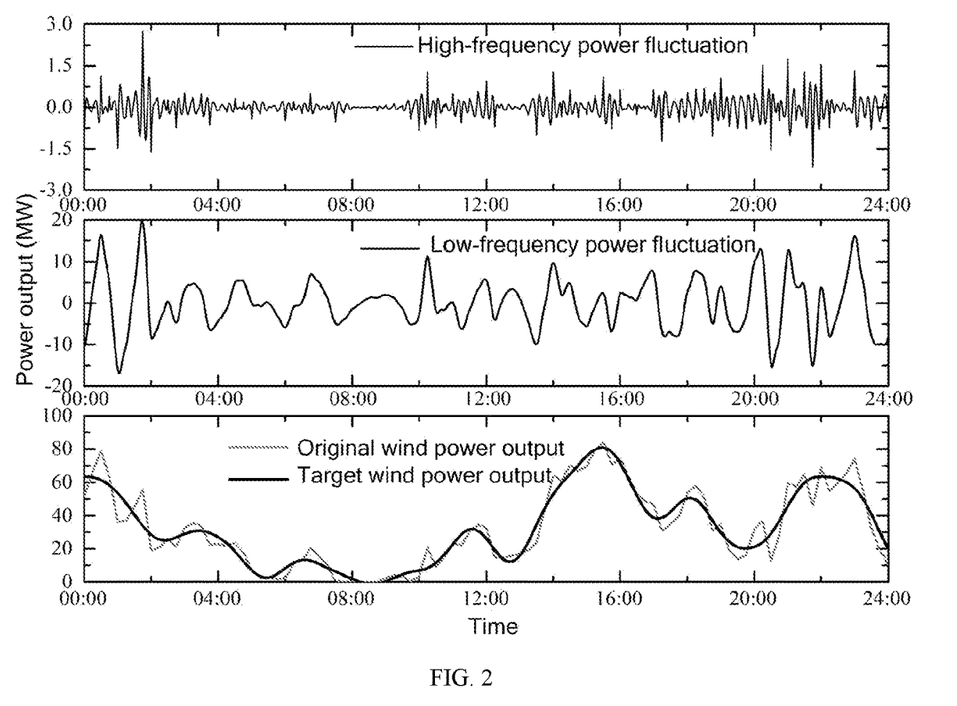
FIG. 2 is a decomposition graph showing a wind power output in a typical wind power scenario according to an embodiment of the present disclosure.

Step 1: the wind power output is decomposed with the wavelet decomposition signal processing method based on frequencies and amplitudes of wind power fluctuations; the wind power output data for 1-minute level is decomposed into the high- and low-frequency fluctuation components for the hybrid energy storage for smoothing, in order to obtain a target power curve of the wind storage power generation system that meets a grid-connected requirement, as shown in FIG. 2.

Figure 3:
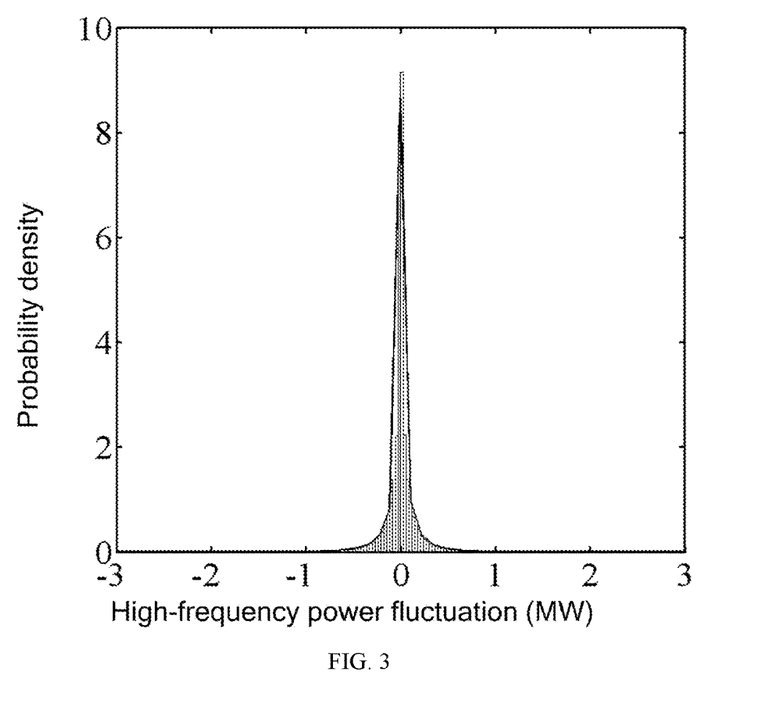
FIG. 3 shows a probability distribution of high-frequency fluctuating powers according to an embodiment of the present disclosure.
Figure 4:
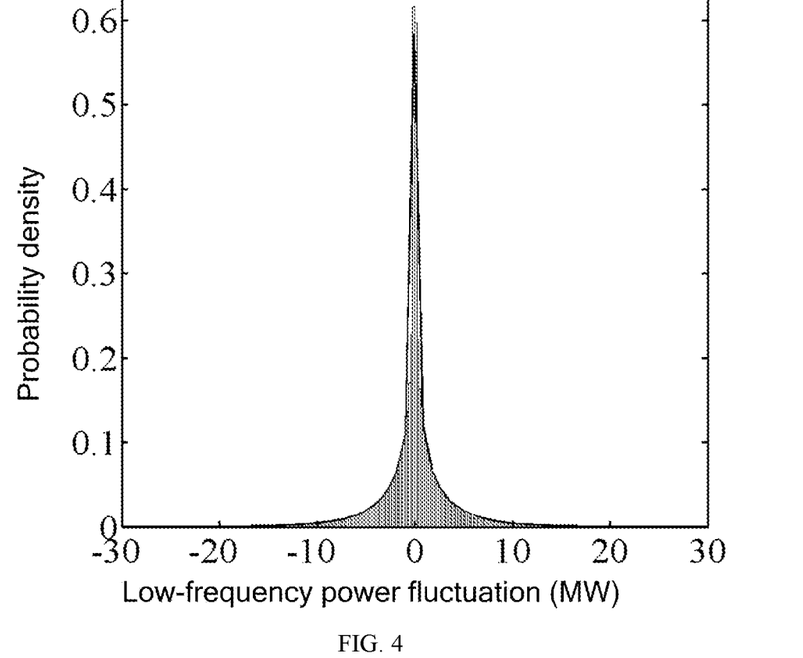
FIG. 4 shows a probability distribution of low-frequency fluctuating powers according to an embodiment of the present disclosure.
Figure 5:
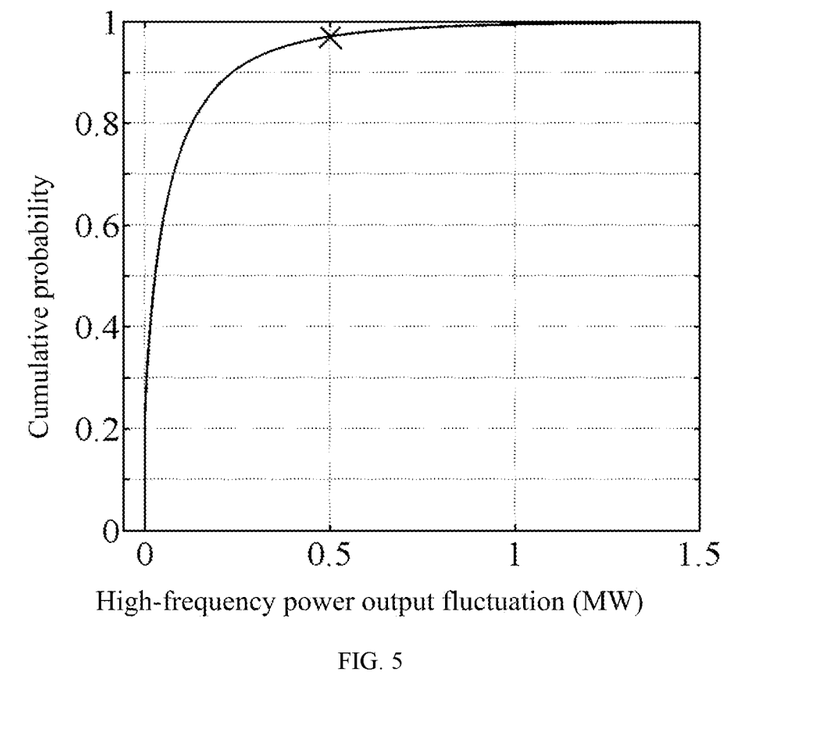
FIG. 5 shows a cumulative probability distribution of the high-frequency fluctuating powers according to an embodiment of the present disclosure.
Figure 6:
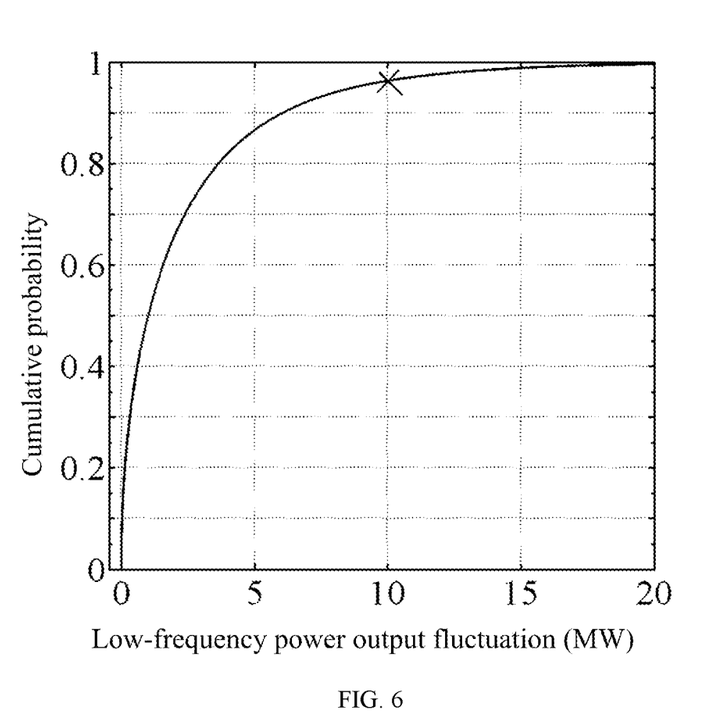
FIG. 6 shows a cumulative probability distribution of the low-frequency fluctuating powers according to an embodiment of the present disclosure.

Step 2: probability distribution functions of the high- and low-frequency fluctuation components of the historical wind power output are calculated, as shown in FIG. 3 and FIG. 4; then cumulative distribution functions of the high- and low-frequency fluctuation components are calculated, and rated powers of the energy-type energy storage and the power-type energy storage are reasonably determined based on a confidence coefficient, as shown in FIG. 5 and FIG. 6. In this embodiment, the rated power of the power-type energy storage is 0.5 MW and the rated power of the energy-type energy storage is 10 MW.

Figure 7:
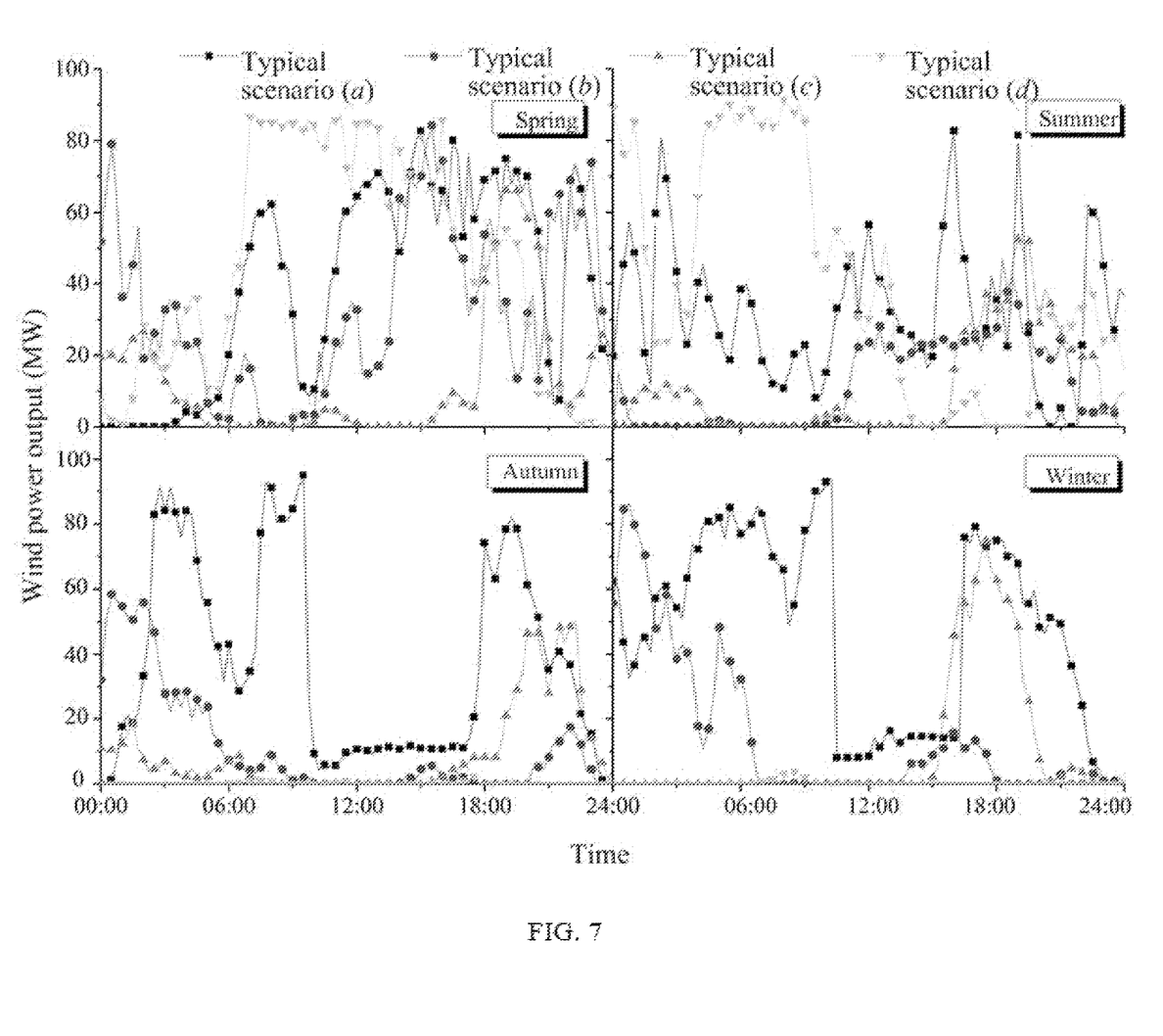
FIG. 7 shows a daily typical scenario of a wind power output in each season according to an embodiment of the present disclosure.

Step 3: according to historical operating data of the wind storage power generation system, the power output processes for 1-minute level for four typical scenarios in each season are obtained with the k-means clustering algorithm, as shown in FIG. 7; the time proportions of the typical wind power scenarios in each season are calculated as the time proportions of the typical scenarios in each season of a planning year of the wind storage power generation system, as shown in Table 1 below.

TABLE 1

Proportions of days of each typical scenario in each season

| Season | Typical scenario | | | |
|--------|---|---|---|---|
|  | a | b | c | d |
| Spring | 6.44% | 8.9% | 7.95% | 1.92% |
| Summer | 4.11% | 9.32% | 10.14% | 1.64% |
| Autumn | 5.75% | 5.48% | 13.29% | 0.41% |
| Winter | 8.63% | 5.34% | 10.41% | 0.27% |

Step 4: it is assumed that the wind storage power generation system runs for 20 years, considering factors such as a establishment cost and an power output stability, the hybrid energy storage capacity optimization model for the full life cycle of the wind farm is established to minimize the NPV of the annual cost and maximize the TSR of the output, where the hybrid energy storage capacity optimization model for the full life cycle of the wind farm includes the objective functions, the decision variables and the constraints. Specifically, a. Objective Functions Objective function $F_1$ to minimize the NPV of the total cost in the full life cycle of the hybrid energy storage. Specifically, $$F_1 = \text{minimize} \sum_{k=1}^{2} \left( C_{Ik} + \sum_{t=1}^{N_k} \frac{C_{Rk}}{(1+r-I)^{n_{k,t}}} \right) \quad (1)$$

where $$N_k = \left[ \sum_{j=1}^{J} \frac{S_{j,k} \cdot p_j \cdot L \cdot 365}{d_k \cdot C_k \cdot c_{yk}} \right] - 1 \quad (2)$$

$$C_{Rk} = \alpha \cdot \beta_n \cdot C_{Ik} = \alpha \cdot \beta_n \cdot A_k \cdot C_k \quad (3)$$

where, $C_{Ik}$ is an initial cost of a k-th energy storage device, in CNY; $C_{Rk}$ is a replacement cost of the k-th energy storage device, in CNY; $N_k$ is a replacement time of the k-th energy storage device, in hours; r is a discount rate for converting a future fund into a present value; I is an inflation rate; $n_{k,t}$ is a period for a k-th replacement of the energy storage device, in years; a is a ratio of the replacement cost to the initial cost; $\beta_n$ is a cost reduction coefficient of an energy storage material in an n-th year; $S_{j,k}$ is a stored electric quantity of the k-th energy storage device in a j-th typical scenario, in MWh; $p_j$ is a time proportion of the j-th typical scenario; L is an operational lifespan of the wind farm, in years; $d_k$ is a discharge depth of the k-th energy storage device; $C_k$ is a capacity of the k-th energy storage device, in MWh; $c_{yk}$ is a cycle number of the energy storage device; $A_k$ is a unit system cost of the k-th energy storage device, in CNY/MWh.

Objective function $F_2$: to maximize the TSR of the power output of the system. Specifically, $$F_2 = \text{maximize} \sum_{j=1}^{J} p_j \cdot TSR_j \quad (4)$$

$$TSR_j = \frac{\sum_{i=1}^{T} \omega_{i,j}}{T} \quad (5)$$

$$\omega_{i,j} = \begin{cases} 1 & P_{i,j} = \overline{P_{i,j}} \\ 0 & P_{i,j} \neq \overline{P_{i,j}} \end{cases} \quad (6)$$

where, $TSR_j$ is a TSR of a hybrid energy storage system (HESS) in the j-th typical scenario; T is a total running period, in min; $\omega_{i,j}$ is a determination coefficient for determining whether a system power output is equal to a target power at an i-th minute of the j-th typical scenario; $P_{i,j}$ is the system power output at the i-th minute of the j-th typical scenario; $\overline{P_{i,j}}$ is the target power at the i-th minute of the j-th typical scenario; J is a total number of the typical scenarios; $p_j$ is a time proportion of the j-th typical scenario.

b. Decision Variables

The decision variables are energy storage capacities $C_k$, in MWh. There are two types of energy storage devices, the power-type energy storage device and the energy-type energy storage device. The decision variables may be divided into the power-type energy storage capacity and the energy-type energy storage capacity.

c. Constraints (1) the energy storage charge and discharge power constraint:

$$\begin{cases} P_{c,min} < P_{c,t} < P_{c,max} \\ P_{d,min} < P_{d,t} < P_{d,max} \end{cases} \quad (7)$$

(2) the power balance constraint:

$$SOC_f = \begin{cases} SOC_{t-1} + \eta_c P_{c,t} \Delta t / S_{Wh} \\ SOC_{t-1} - P_{d,t} \Delta t / (S_{Wh} \eta_d) \end{cases} \quad (8)$$

(3) the energy storage SOC constraint: $SOC_{min} \leq SOC_t \leq SOC_{max}$ (9)

(4) a non-negative constraint: all the variables above have non-negative values.

where, $P_{c,t}$ is an energy storage charge power at time t, in MW; $P_{d,t}$ is an energy storage discharge power at time t, in MW; $P_{c,min}$ is a lower limit of the energy storage charge power, in MW; $P_{d,min}$ is a lower limit of the energy storage discharge power, in MW; $P_{c,max}$ is an upper limit of the energy storage charge power, in MW; $P_{d,max}$ is an upper limit of the energy storage discharge power, in MW; $\eta_c$ is an energy storage charge efficiency; $\eta_d$ is an energy storage discharge efficiency; $\Delta t$ is a control interval, in min; $S_{Wh}$ is a rated capacity of the energy storage, in MW; $SOC_t$ is an energy storage at time t; $SOC_{t-1}$ is an energy storage at time t−1; $SOC_{min}$ is a lower limit of the energy storage; $SOC_{max}$ is an upper limit of the energy storage.

Figure 8:
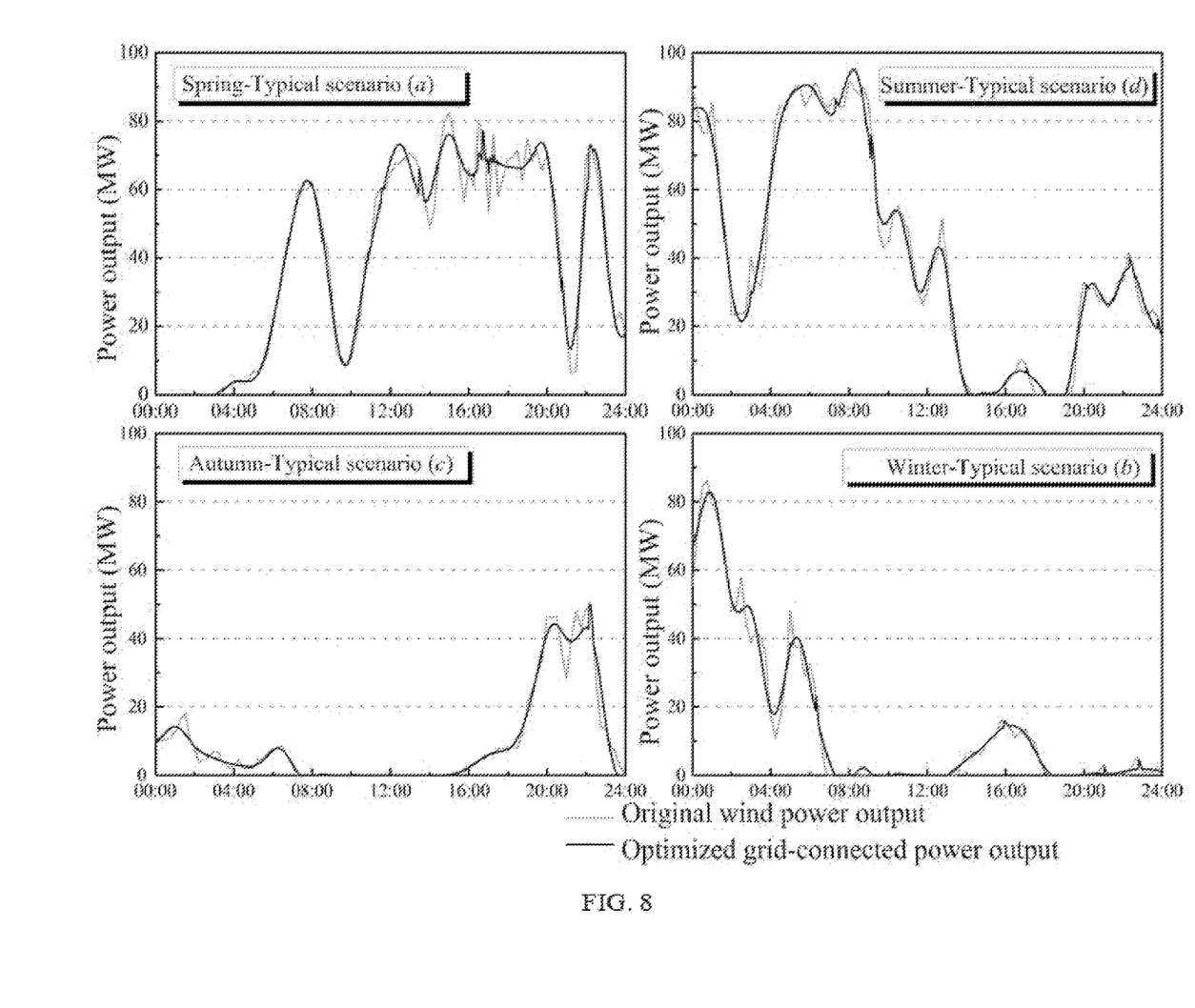
FIG. 8 shows a comparison of power output curves of the wind storage power generation system before and after an implementation of the present disclosure.

Step 5: the hybrid energy storage capacity configuration of the wind storage power generation system are solved with the multi-objective optimization algorithm, as shown in Table 3. The optimal configuration includes super capacitors (SCs) of 500 kW/93 kWh and vanadium redox flow batteries (VRBs) of 10 MW/7.53 MWh. The target power curves of wind power and high- and low-frequency power fluctuation curves obtained in Step 1, the rated powers of the hybrid energy storage obtained in Step 2, the time proportion of each typical scenario determined in Step 3, and the characteristic parameters of the energy storage materials in Table 2 are taken as inputs, and the optimization results of the wind power output in the typical scenarios are taken as outputs. Then the power output curves of the wind storage power generation system before and after optimization are shown in FIG. 8.

TABLE 2

Characteristic parameters of energy storage materials

| Energy storage parameters | SC | Flywheel energy storage | VRB | Lithium-ion battery (Li-ion) |
|---|---|---|---|---|
| System cost (in CNY/kWh) | 12000 | 6500 | 3500 | 2300 |
| Number of cycles | 100000 | 20 years | 16000 | 5000 |
| Conversion efficiency | 95% | 85% | 80% | 95% |
| Discharge depth | 100% | 100% | 90% | 95% |

TABLE 3

Optimal hybrid energy storage capacity configuration scheme for the wind storage power generation system

| Optimized results | SC + VRB | Flywheel energy storage + VRB | SC + Li-ion |
|---|---|---|---|
| Type I energy storage capacity (in kWh) | 93 | 313.2 | 93 |
| Type II energy storage capacity (in kWh) | 7.53 | 7.53 | 6.15 |
| Objective 1: NPV (in 10,000 CNY) | 2747.1 | 2839.08 | 2776.0 |
| Objective 2: TSR | 91.47% | 91.28% | 93.26% |
| Replacement times of type I energy storage | 0 | 0 | 0 |
| Replacement times of type II energy storage | 0 | 0 | 3 |

$PRR_{\Delta t}$ is set as the smoothing index of the target power curve of wind power; $PRR_{\Delta t}$ is used to evaluate the fluctuation smoothing effect of the power curve of wind power, and $PRR_{\Delta t}$ is calculated as follows:

$$PRR_{\Delta t} = \frac{P_{max,\Delta t} - P_{min,\Delta t}}{P_R} \times 100\% \qquad (10)$$

where, $P_{max,\Delta t}$ is the maximum wind power output during $\Delta t$, in MW; $P_{min,\Delta t}$ is the minimum wind power output during $\Delta t$, in MW; $P_R$ is a rated power of the wind storage power generation system. A lower PRR indicates a better smoothing effect.

In this embodiment, $\Delta t$ was 1 minute and 10 minutes, respectively. The fluctuation amplitude reduction effect of the wind storage power generation system is obvious (see Table 4), and the number of wind power output fluctuations is decreased by 71.25%. Therefore, after the optimization, the amplitude and frequency of the grid-connected power generation system are reduced, and the stability of the grid-connected power supply is improved.

TABLE 4

Fluctuation effect of the wind storage power generation system after optimization

| Fluctuation | Index | |
|---|---|---|
| amplitude reduction | $PRR_{1\ min}$ | $PRR_{10min}$ |
| Maximum fluctuation | −74.43% | −70.40% |
| Average fluctuation | −33.49% | −25.24% |

In order to verify the superiority of the hybrid energy storage solution over a single energy storage solution, the single energy storage solution adopts the VRB for comparison. The results show that, due to the frequent charge and discharge of the single storage battery, the lifespan of the VRB quickly drops to 7.1 years, which is far less than its design life. In addition, the replacement cost of the VRB increases, and the NPV of the total cost increases by 1.046 million. The participation of the hybrid energy storage greatly optimizes the working status of the energy storage system and extends its operational lifespan.

The above embodiments are only used to illustrate the technical ideas and features of the present disclosure, such that those skilled in the art may understand the content of the present disclosure and implement the present disclosure accordingly. The scope of the present disclosure is not limited by the above embodiments, that is, any equivalent changes or modifications made under the spirit disclosed by the present disclosure still fall within the scope of the present disclosure.

What is claimed is:

1. An optimal configuration method for a hybrid energy storage of a grid-connected wind storage power generation system, comprising: performing a frequency domain decomposition on a historical wind power output, to count a high-frequency component and a low-frequency component of the historical wind power output, and determining a rated power of the hybrid energy storage based on a probability distribution function; establishing a hybrid energy storage capacity optimization model for a full life cycle of a wind farm to minimize a net present value of an annual cost and maximize a target satisfaction rate (TSR) of an output; extracting a daily typical scenario for the wind power output based on a clustering algorithm, to count a time proportion of each typical scenario as an input scenario of the hybrid energy storage capacity optimization model for the full life cycle of the wind farm; solving with a multi-objective optimization algorithm, to obtain an optimal hybrid energy storage capacity configuration scheme for the grid-connected wind storage power generation system; and operating the grid-connected wind storage power generating system based on the optimal hybrid energy storage capacity configuration scheme, wherein an objective function $F_1$ is established to minimize the net present value of the annual cost:

$$F_1 = \text{minimize} \sum_{k=1}^{2}\left(C_{Ik} + \sum_{t=1}^{N_k} \frac{C_{Rk}}{(1+r-I)^{n_{k,t}}}\right), \text{ wherein}$$

$$N_k = \left[\sum_{j=1}^{J} \frac{S_{j,k} \cdot p_j \cdot L \cdot 365}{d_k \cdot C_k \cdot c_{yk}}\right] - 1;$$

$$C_{Rk} = \alpha \cdot \beta_n \cdot C_{Ik} = \alpha \cdot \beta_n \cdot A_k \cdot C_k;$$

wherein, $C_{Ik}$ is an initial cost of a k-th energy storage device, in CNY; $C_{Rk}$ is a replacement cost of the k-th energy storage device, in CNY; $N_k$ is a replacement time of the k-th energy storage device, in hours; r is a discount rate for converting a future fund into a present value; I is an inflation rate; $n_{k,t}$ is a period for a k-th replacement of the energy storage device, in years; a is a ratio of the replacement cost to the initial cost; $\beta_n$ is a cost reduction coefficient of an energy storage material in an n-th year; $s_{j,k}$ is a stored electric quantity of the k-th energy storage device in a j-th typical scenario, in MWh; $P_j$ is a time proportion of the j-th typical scenario; L is an operational lifespan of the wind farm, in years; $d_k$ is a discharge depth of the k-th energy storage device; $C_k$ is a capacity of the k-th energy storage device, in MWh; $c_{yk}$ is a cycle number of the energy storage device; $A_k$ is a unit system cost of the k-th energy storage device, in CNY/MWh; J is a total number of the typical scenarios.

2. The optimal configuration method for the hybrid energy storage of the grid-connected wind storage power generation system according to claim 1, wherein the frequency domain decomposition on the historical wind power output comprises a wavelet decomposition, a Kalman filtering and/or an empirical mode decomposition.

3. The optimal configuration method for the hybrid energy storage of the grid-connected wind storage power generation system according to claim 1, wherein the clustering algorithm comprises a K-means clustering method, a hierarchical clustering method and/or a Gaussian mixture model method.

4. The optimal configuration method for the hybrid energy storage of the grid-connected wind storage power generation system according to claim 1, wherein an objective function $F_2$ is established to maximize the TSR of the output:

$$F_2 = \text{maximize} \sum_{j=1}^{J} p_j \cdot TSR_j,$$

wherein $$TSR_j = \frac{\sum_{i=1}^{T} \omega_{i,j}}{T};$$

-continued $$\omega_{i,j} = \begin{cases} 1 & P_{i,j} = \overline{P_{i,j}} \\ 0 & P_{i,j} \neq \overline{P_{i,j}} \end{cases};$$

wherein, $TSR_j$ is a TSR of a hybrid energy storage system in the j-th typical scenario; T is a total running period, in min; $\omega_{i,j}$ is a determination coefficient of whether a system power output is equal to a target power at an i-th minute of the j-th typical scenario; $P_{i,j}$ is the system power output at the i-th minute of the j-th typical scenario; $\overline{P_{i,j}}$ is the target power at the i-th minute of the j-th typical scenario; J is a total number of the typical scenarios; $P_j$ is a time proportion of the j-th typical scenario.

5. The optimal configuration method for the hybrid energy storage of the grid-connected wind storage power generation system according to claim 1, wherein the hybrid energy storage capacity optimization model for the full life cycle of the wind farm has constraints, comprising:

an energy storage charge and discharge power constraint:

$$\begin{cases} P_{c,min} < P_{c,t} < P_{c,max} \\ P_{d,min} < P_{d,t} < P_{d,max} \end{cases};$$

a power balance constraint:

$$SOC_t = \begin{cases} SOC_{t-1} + \eta_c P_{c,t} \Delta t / S_{Wh} \\ SOC_{t-1} - P_{d,t} \Delta t / (S_{Wh} \eta_d) \end{cases}; \text{ and}$$

an energy storage state of charge (SOC) constraint:
$SOC_{min} \leq SOC_t \leq SOC_{max}$;
wherein, $P_{c,t}$ is an energy storage charge power at time t, in MW; $P_{d,t}$ is an energy storage discharge power at time t, in MW; $P_{c,min}$ is a lower limit of the energy storage charge power, in MW; $P_{d,min}$ is a lower limit of the energy storage discharge power, in MW; $P_{c,max}$ is an upper limit of the energy storage charge power, in MW; $P_{d,max}$ is an upper limit of the energy storage discharge power, in MW; $\eta_c$ is an energy storage charge efficiency; $\eta_d$ is an energy storage discharge efficiency; $\Delta t$ is a control interval, in min; $S_{Wh}$ is a rated capacity of the energy storage, in MW; $SOC_t$ is an energy storage at time t; $SOC_{t-1}$ is an energy storage at time t-1; $SOC_{min}$ is a lower limit of the energy storage; $SOC_{max}$ is an upper limit of the energy storage.

6. The optimal configuration method for the hybrid energy storage of the grid-connected wind storage power generation system according to claim 1, wherein $PRR_{\Delta t}$ is set as a smoothing index for a target power curve of wind power; $PRR_{\Delta t}$ is used to evaluate a fluctuation smoothing effect of the target power curve of the wind power, and $PRR_{\Delta t}$ is calculated as follows:

$$PRR_{\Delta t} = \frac{P_{max,\Delta t} - P_{min,\Delta t}}{P_R} \times 100\%;$$

wherein, $P_{max,\Delta t}$ is a maximum wind power output during $\Delta t$, in MW; $P_{min,\Delta t}$ is a minimum wind power output during $\Delta t$, in MW; $P_R$ is a rated power of the wind farm.

7. The optimal configuration method for the hybrid energy storage of the grid-connected wind storage power generation system according to claim 1, wherein the multi-objective optimization algorithm comprises a dynamic programming algorithm or a heuristic algorithm.

8. The optimal configuration method for the hybrid energy storage of the grid-connected wind storage power generation system according to claim 7, wherein the heuristic algorithm comprises a genetic algorithm, an artificial neural network and an ant colony algorithm.

* * * * *